United States Patent
Panico et al.

(12)

(10) Patent No.: US 6,729,021 B2
(45) Date of Patent: May 4, 2004

(54) METHOD FOR THE INSTALLATION OF SIGNALIZATION SPHERES ON LIGHTNING ROD CABLES OF TRANSMISSION LINES

(75) Inventors: Milton Junior Panico, Rio de Janeiro (BR); Jose Robson Brandao De Oliveira, Rio de Janeiro (BR); Ricardo Coelho Rodrigues, Rio de Janeiro (BR)

(73) Assignee: Furnas Centrais Eletricas S/A, Rio de Janeiro (BR)

( * ) Notice: Subject to any disclaimer, the term of this patent is extended or adjusted under 35 U.S.C. 154(b) by 0 days.

(21) Appl. No.: 10/125,550

(22) Filed: Apr. 19, 2002

(65) Prior Publication Data

US 2002/0153148 A1 Oct. 24, 2002

(30) Foreign Application Priority Data

Apr. 23, 2001 (BR) ............................................. 0103416

(51) Int. Cl.[7] ................................................. H05K 3/30
(52) U.S. Cl. ............................. 29/832; 29/739; 29/740; 29/825
(58) Field of Search .......................... 29/825, 832, 739, 29/740

(56) References Cited

U.S. PATENT DOCUMENTS 4,422,528 A * 12/1983 Patterson ................... 182/145
4,801,937 A * 1/1989 Fernandes ............... 340/870.16
4,868,887 A * 9/1989 Bertrand .................... 455/41.1

* cited by examiner

Primary Examiner—Rick Kiltae Chang
(74) Attorney, Agent, or Firm—Jacobson Holman PLLC

(57) ABSTRACT

A method of installing signalization spheres on energized transmission lines. A supporting structure, consisting of two bases equidistant, parallel to each other, linked to each other by axial segments, the axial segments acting as supports for activation engines, respectively, a grounding and idler tension system including a structure formed by two parallel rods that move along the vertical direction linked to two bases equidistant and parallel to each other in its intermediate portion through an axis. In its superior extremity through an axis and presenting in its inferior extremity slots for the introduction of an axis of a wheel. A first axial segment being equipped in its intermediate portion with a threaded rod which is linked it its inferior extremity to the axial segment of the bases superiorly equipped with a crank and spring. A fork is articulated over a pivot to the external part of the bases whereto are projected the feeding system. An inclined structure consisting of two bases equidistant to each other is linked to each other by four axial segments. The latter acting as a support for the tightening and loosening tool presents in its terminal portion a coupling prism suspended internally and externally by bars respectively and equidistant to each other by the axial segments.

3 Claims, 3 Drawing Sheets

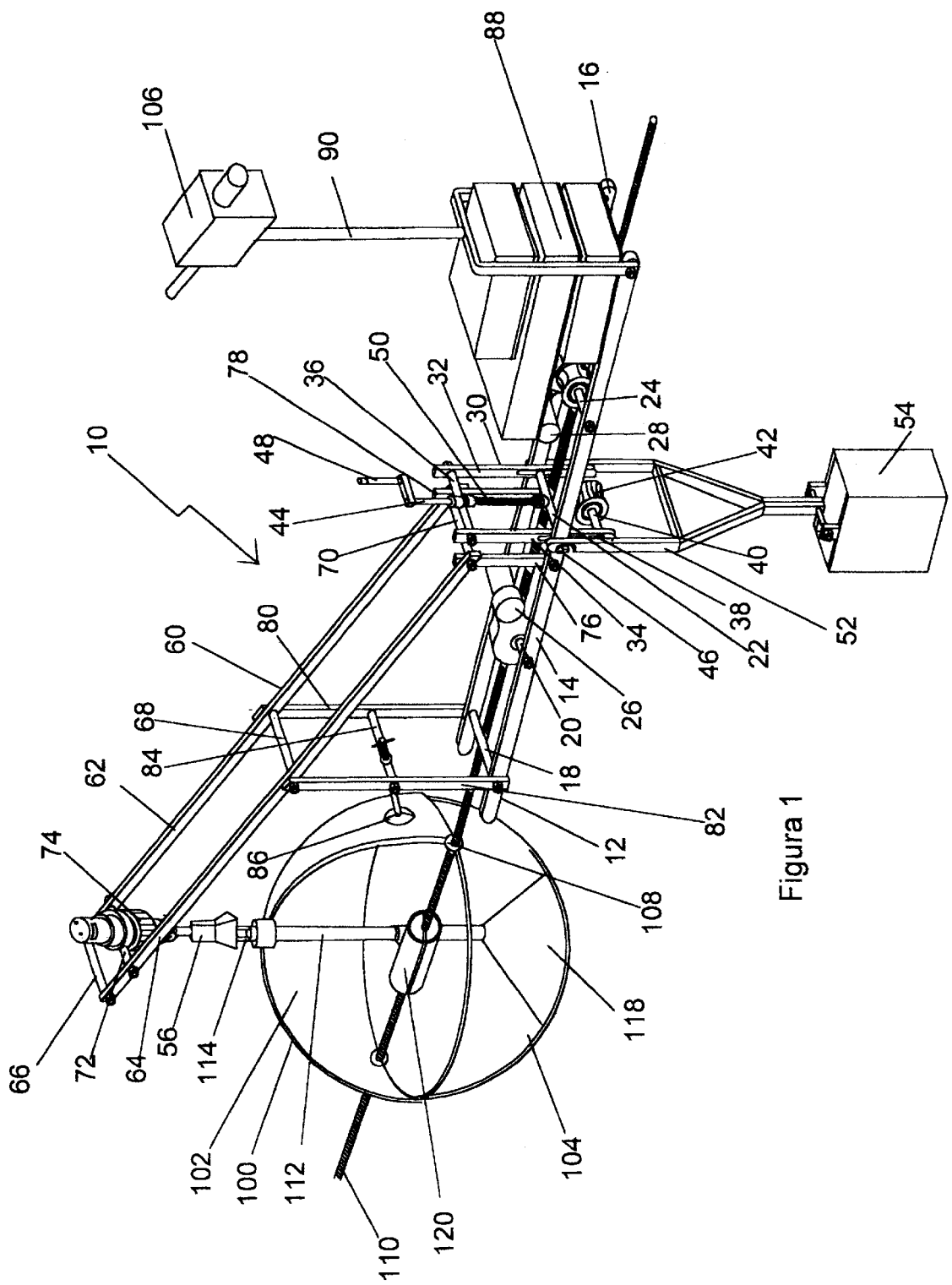
Figura 1

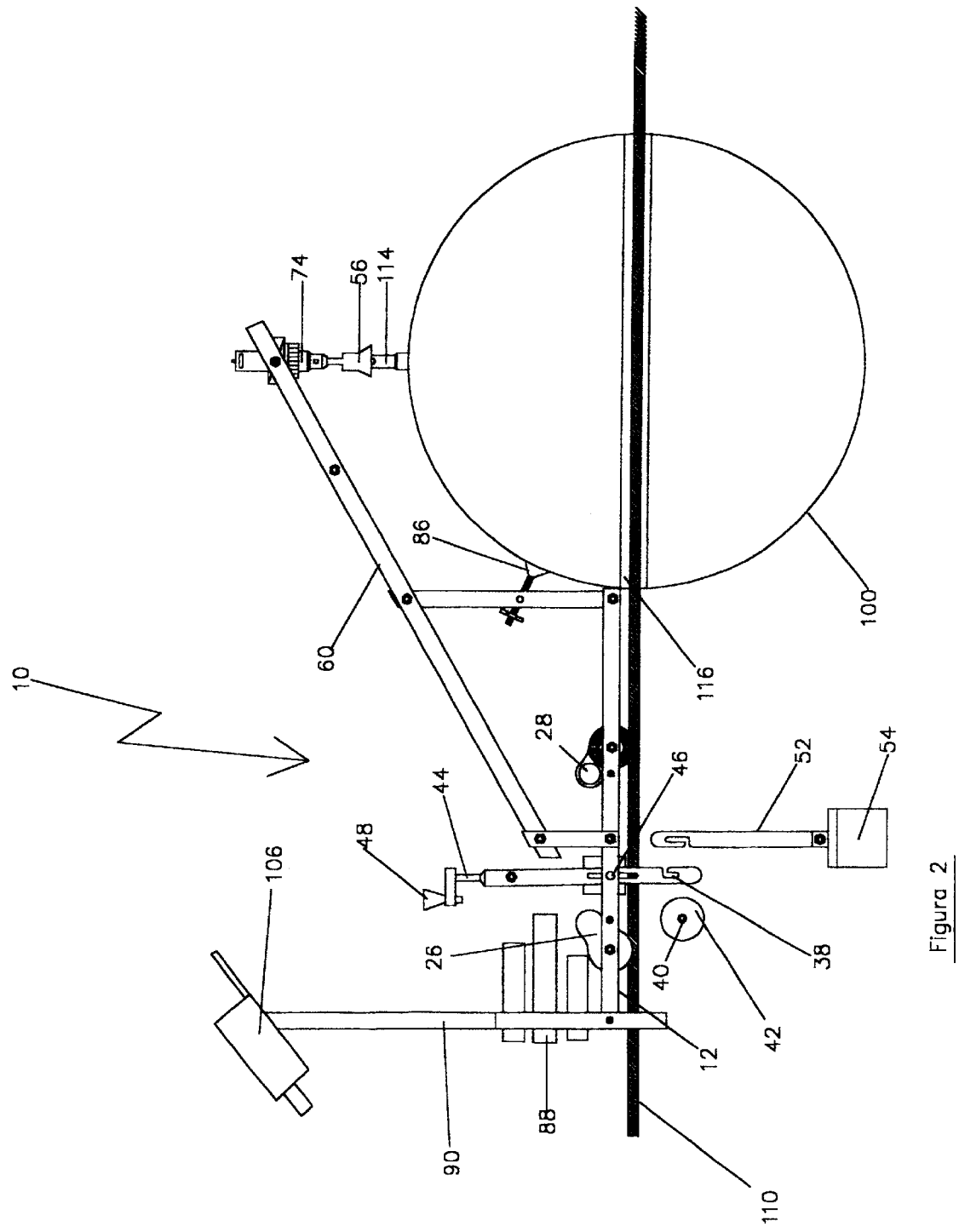
Figura 2

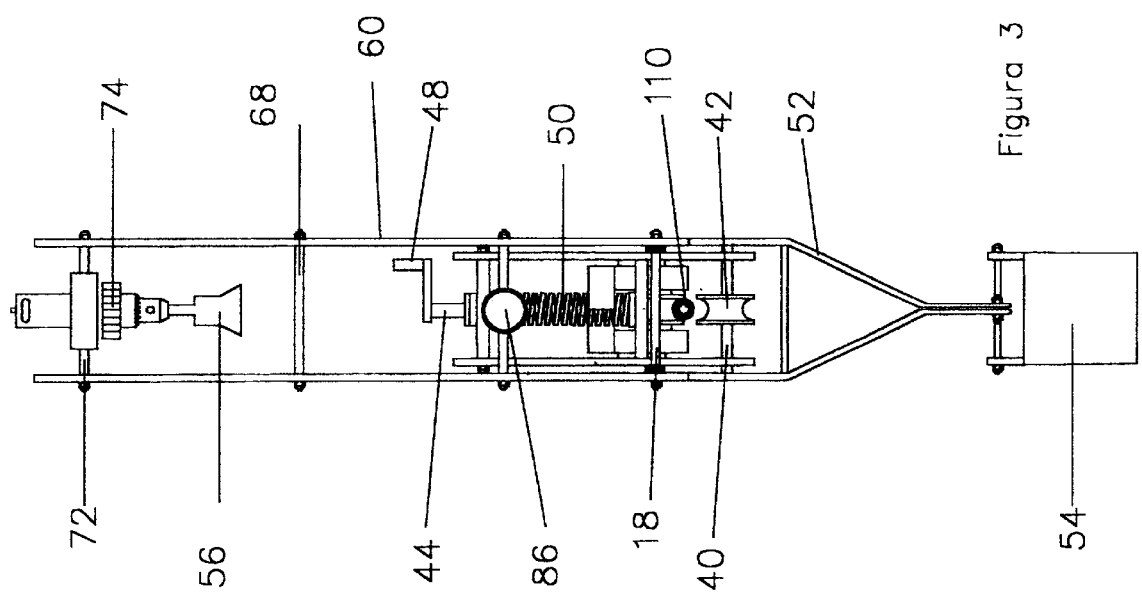
Figura 3

METHOD FOR THE INSTALLATION OF SIGNALIZATION SPHERES ON LIGHTNING ROD CABLES OF TRANSMISSION LINES

FIELD OF INVENTION

The present invention relates to an unmanned mobile device which, by means of remote control, makes it possible to install signalization spheres on transmission lines' lightning rod cables, with the line connected, the sweeping of the cable for maintenance purposes, as well as a method for installation of signalization spheres on transmission lines' lightning rod cables using the device.

STATE OF THE ART

The transportation of large blocks of electric power through long distances is done by means of transmission lines that extend several kilometers within countries. Those power lines are lifted by towers that support themselves by means of spands, crossing rivers, railroads, roadways, or other transmission lines, and may reach heights considerably elevated above the ground.

Due to these and other factors that affect the visibility of transmission lines, those lines represent a hazard for aircrafts.

In order to reduce the danger involved, so-called line signals have been developed which, due to their size and color, provide signalization to aircraft operators, alerting them about the presence of rivers, railroads, or other transmission lines. In recent past, line signals have been installed at strategic distances, along transmission line spans that extend between support towers, so that those elements can become more visible to aircraft operators flying nearby.

Although there are a significant number of accidents involving aircraft hitting transmission lines, spherical signals have seldom been used so far, not only due to the high cost involving their installation in existing lines, but mainly because of the difficulty regarding their installation. The difficulty and cost of installation result from the inaccessibility to the installations, the high voltage that they can transmit and the existing and available line signals themselves, which, for the purposes of a faultless installation, require disconnection of the current flow along the lines, and removal of the lightning rods of the towers or sending manpower and equipment to the towers and lines, so that it will be possible to provide installation of the line signals. That is a time-consuming procedure, as well as difficult, costly, and dangerous, and considering the reasons mentioned above, regarded as prohibitive in several locations.

As it is the knowledge of technicians on the subject, disconnecting high tension lines to install signalization spheres is becoming more difficult every day due to power shortage, as most circuits operate within their limits and an unscheduled disconnection could cause a general overload in all circuits, which could induce a blackout of national proportions.

In light of the problems presented, new alternative techniques have been developed in order to make it possible the operation with the circuits connected, working with live lines, avoiding large power block breaks for consumers.

Basically, three techniques are known so far for the installation of signalization spheres in transmission lines. Those are, the use of a sliding chair on the lightning rod cable, the lowering of lightning rod cables until reaching the phases and the use of helicopters.

After several fatal accidents, all power companies are abrogating the use of the sliding chair technique or any other technique for which the electrician must walk along the lightning rod cable. The cable sometimes would break during the walk, as line electricians had no way to accurately assess lightning rod cable conditions.

Nowadays, although the lowering of lightning rod cables until reaching the phases and the helicopter techniques are being used, the use of signalization sphere installation by means of helicopters, even if perfect weather and wind conditions, is becoming the best option. Even though the costs are relatively high, the cable lowering technique bears an additional disadvantage, that is, the necessary disconnection of circuits.

There is thus the need to provide installation of signalization spheres, unmanned and movable that, by means of remote control, will make it possible for the installation of signalization spheres on transmission line lightning rod cables, as well as the sweeping of the same for maintenance purposes, with the line connected.

SUMMARY OF THE INVENTION

With a view to solving the problems previously listed, in accordance with a first embodiment of the present invention, an unmanned device, movable and activated by radio control is provided; developed for the installation of signalization spheres and the checking of lightning rod cable conditions, including a structure of support which consists of two equidistant and parallel bases, connected by axial segments that serve as supports for the activation engines, respectively, a grounding and traction system made of a structure composed of two parallel rods connected by axial segments, showing on their lower end slots for the introduction of a wheel shaft, called a first axial segment, having in its middle section a threaded rod connected on its lower end to the axial segment of the bases, presenting an upper handle and a spring, a movable fork on the external part of the bases on which projects the feeding movable fork descending and balanced, an ascending vertical structure inverted U-shaped, connected externally to a tilted structure to the front part of the bases, having two bars for receiving by fixation of a tightening and loosening tool and showing on their final section a coupling prism with a square hollow inside.

The present invention still uses a sphere to be installed by helicopters with the purpose to be driven (pushed) to the location of installation and fitted by an unmanned, movable device activated by remote control, including two semi-spheres, one vertical shaft furnished with a tightening eyelet on its upper end connected on the lower part to one of the semi-sphere supports which when connected by a walrus-type connector form a conduit for purposes of lightning bolt system fitting.

Moreover, according to a second embodiment of the present invention, a sphere installation method on energized transmission lines is provided, where it is not necessary for the disconnection of the lines. This method does not use a helicopter-type vehicle, reducing significantly the costs if compared to the methods used nowadays, regardless of wind conditions, nor does it cause any losses to power companies, which would be generated by the break of energy supply. The method, according to the second embodiment of the present invention, comprises the following stages:

Fitting of a signalization sphere through the side span existing between the two semi-spheres on the lightning rod cable, until the lightning rod cable is inside and not fastened to the walrus-type connector, so that the signalization sphere will be ready to be moved without the risk of falling along the lightning rod cable.

Fitting of the device upstream from the signalization sphere. Laying the device on the lightning rod cable that will be in contact with the two activating engines of the installation device. Fitting the wheel in the slot through the shaft notch, so that the device grounding can be made, once the wheel is made of metallic conductive material and all the other components of the device are insulated.

Fitting of the fork on the external part of the bases by means of a pivot, furnished with the feeding system;

Coupling of the vertical shaft eyelet end of the sphere inside the device coupling prism and the fixing of safety cupping-glass.

Activating the device by means of a remote control transmitter activated by activating forward/backward engines, taking it to the appropriate location of the sphere;

Rotating wrench-wise, by means of remote control, in the objective location of the installation of the tightening and loosening tool. The tightening will operate on the vertical shaft end of the sphere providing the closing of the walrus-type connector on the lightening rod cable.

BRIEF DESCRIPTION OF THE DRAWINGS

These objectives, features and advantages of the present invention, will become more distinct if examined with the detailed description that follows, when they will be considered as a whole with the drawings that are attached to this report.

FIG. 1 represents a perspective view of the device and sphere, during an installation operation of the lightning rod cable signal.

FIG. 2 represents a lateral view of the device.

FIG. 3 represents a front view of the device already assembled on the lightening rod cable, where we can distinctly notice the coupling prism of the shaft.

DETAILED DESCRIPTION OF THE INVENTION

As we can gather from the Figures where the same number references identify correspondent parts, the installation device and the checking of the lightning rod cable conditions, in accordance with a first embodiment of the present invention, generally indicated by numeric reference 10, comprises a structure of support 12 which consists of two equidistant and parallel bases 14 and 16, connected by axial segments 18, 20, 22 and 24, axial segments 20 and 24 serving as supports for activating engines 26 and 28, respectively. A grounding and traction system is comprised of a structure 30 formed by two parallel rods 32 and 34 which move vertically and are connected to two equidistant and parallel bases 14 and 16, in their middle section through shaft 22, on their upper end through shaft 36 and showing on its lower end slots 38 for the introduction of a shaft 40 of a wheel 42. A first axial segment 22 being furnished in its middle section with a threaded rod 44 which is connected on its lower end to the aforesaid axial segment 22 of the bases 14, 16, furnished on the upper side of a crank 48 and spring 50. A fork 52 is articulated on pivot 46 on the external part of the aforesaid bases 14, 16, on which is projected the feeding system 54. A tilted structure 60 consisting of two equidistant bases 62 and 64 is connected by four axial segments 66, 68, 70 and 72, the latter serving as support to the tightening and loosening tool 74, shown in its terminal portion as including a coupling prism 56 and still hoisted internally and externally by bars 76, 78, 80, 82, respectively, equidistant by axial segments 70 and 68, 18, 84. The middle part of the latter holding cupping glass 86 and still on the posterior part the parallel bases 14 and 16 the remote control reception circuit boxes are projected—commands 88.

As we can see in FIGS. 1 and 2 a sphere is provided for line signals purposes, generally indicated by numeric reference 100, comprising two semi-spheres 102, 104, fitted on their side terminals with plastic projections 108 that, when connected, make a unit for the fitting on the lightning rod cable 110. A vertical shaft 112 is fitted with an eyelet 114 on its upper end, connected on its lower part to a support 118 of the semi-sphere 104. The aforesaid vertical shaft is connected to a walrus-type connector 120.

Still according to the Second embodiment of the present invention, a method for the installation of signal spheres in energized transmission lines is provided. The method includes the following stages:

Fitting of a signalization sphere 100 through the side span 116 existing between the two semi-spheres 102, 104 on the lightning rod cable 110, until the lightning rod cable is inside and not fastened to the walrus-type connector 120, so that the signalization sphere will be ready to be moved without the risk of falling along the lightning rod cable 110.

Fitting of the device 10 upstream against the aforesaid perfected signalization sphere 100, laying the device on the lightning rod cable that will be in contact with activating engines 26 and 28 of the aforesaid installation device 10. Fitting the wheel 42 in the slot 38 through the shaft notch 40, so that the device 10 grounding can be made, once the wheel is made of metallic conductive material and all the other components of the device are insulated.

Fitting of the fork 52 on the external part of the bases 14, 16 by means of a pivot 46, and the feeding system 54;

Coupling of the coupling prism end 56 to horizontal shaft 112 of the sphere 100 at the end of eyelet 114 of device 10.

Activation of the device 10 by a remote control transmitter by means of the forward/backward engines 26, 28, leading it to the appropriate location for the installation of the sphere 100;

Wrench-wise rotation, by means of remote control, at the objective location of the installation, of the tightening and loosening tool 74, which tightening will operate in the eyelet 114 of the vertical shaft end 112, providing the closing of the walrus-type connector 120 on the lightening rod cable 110.

As we can see in FIGS. 1 and 2, a cupping-glass 86 is provided and coupled to shaft 84 that is located on the front part of device 10 that will stick to the external surface of the signal sphere by contact suction, as well as a video camera 106 in order to sweep the lightening rod cable 110 for maintenance purposes.

If the checking of the conditions of the lightening rod cable 110 becomes necessary, in the same way it had been assembled before, the device 10 will be used to travel all the length of interest of the lightening rod cable 110, once it has a video camera 106 coupled to the rod 90. The aforesaid video camera 106 will monitor the signal sphere 100 installation operations and traveling that length will provide all necessary information of the cable condition for possible maintenance.

It is important to notice that the make of the remote control used for this invention is a Futaba model FP-T4NTBF, although this invention is not restricted to only this one. Moreover, the tension of battery 54 (12 volts) is transferred to the activating engines 26 and 28 and to the tightening and loosening tool 74 by means of a parallel cord to the control boxes 88 and, although the invention is not restricted to this one, the control boxes are formed by a Futaba FPR 127-DF receptor, with two S 3003 servomechanisms and a feeding unit that after receiving the commands activate the two forward/backward engines 26 and 28 and the tightening and loosening tool 74 that shows a torque device manned by the user.

As has been mentioned before, this method uses signalization spheres 100, adequate for helicopters that have an eyelet 114 at the end of the vertical shaft 112 and, when it moves, it displaces the walrus-type connector 120, as can be seen in FIG. 2. If the movement of the tightening and loosening tool 74 is towards tightening, the walrus-type connector 120 will be displaced at the closing of the lateral span 116 existing between the two semi-spheres 102 and 104, that form the afore mentioned signal sphere 100 and therefore, the wrenching of the walrus-type connector 120 on lightening rod cable 110.

Also worth highlighting is, in the assembly of the metallic conductive wheel 42 on slot 38 in order to provide the earthing of the device 10, idler tension control is provided as well; noting, also, that, in order to surpass sharp-edged acclivities and declivities, it is necessary, in such case, to operate on the crank 48, which, through the vertical axis 44, supported bent over fixed axis 22, suspends the entire mobile array compounded by mobile rods 32 and 34 in the mobile axis 36 fixed in its upper part by tightening the wheel 48 over lightning-rod cable 110, where spring 50 of such array operates as a dampener.

Finally, the above described embodiments of the invention are intended to be illustrative only. Numerous alternative embodiments can be described by technical experts on such matter without escaping the scope of the claims.

What is claimed is:

1. Method for installation of signalization spheres on energized transmission lines, comprising the following steps:

placing a signalization sphere through a lateral spacing existing between two semi-spheres on a lightning rod cable until the lightning rod cable is accommodated by a walrus-type connector as, the signalization sphere is made available to be transported without risk of falling along said lighting rod cable;

placing an installation device upstream, in relation to the signalization sphere, by placing the device over the lightning rod cable, which is in contact with two activation engines of the installation device, by placing a wheel in a slot through an axis groove so that, in this way, the grounding of the device is effected, as the wheel is constituted by metallic conductive material and all the other components of the device are made of an insulating material;

coupling of an extremity of a coupling prism to a horizontal axis of the sphere in an extremity of an eyelet to the installation device;

activating the device by a remote-control transmitter by the engines; and rotating in a tightening direction, through remote control, a tightening and loosening tool, which rotation affects the eyelet of the extremity at a vertical axis, providing closure of the walrus-type connector over the lightning rod cable.

2. The method, according to claim 1, further comprising a grounding and idler tension array of the device assembled with a feeding system assembled in a pivot (46), acts as a pendulum, being responsible for balance of the array.

3. The method, according to claim 1, wherein a voltage of a feeding system is transferred towards the activation motors as well as to the tightening and loosening tool by parallel wires.

* * * * *